United States Patent [19]

Chao

[11] Patent Number: 4,474,896
[45] Date of Patent: Oct. 2, 1984

[54] ADSORBENT COMPOSITIONS
[75] Inventor: Chien C. Chao, Millwood, N.Y.
[73] Assignee: Union Carbide Corporation, Danbury, Conn.
[21] Appl. No.: 480,699
[22] Filed: Mar. 31, 1983
[51] Int. Cl.³ .................... B01J 27/02; B01J 49/00; B01D 15/00
[52] U.S. Cl. .................... 502/216; 502/219; 502/220; 502/221; 502/222; 502/223; 210/660; 55/59; 55/74
[58] Field of Search ................................... 252/439
[56] References Cited

U.S. PATENT DOCUMENTS

| 2,882,243 | 4/1959 | Milton | 423/329 X |
|---|---|---|---|
| 3,194,629 | 7/1965 | Dreibelbis et al. | 423/219 X |
| 3,516,947 | 6/1970 | Dudzik | 208/109 X |
| 3,702,886 | 11/1972 | Argauer et al. | 423/328 |
| 3,709,979 | 1/1973 | Chu | 252/455 Z X |
| 3,832,449 | 8/1974 | Rosinski et al. | 208/111 X |
| 3,849,537 | 11/1974 | Allgulin | 423/210 M |
| 4,094,777 | 6/1978 | Sugier et al. | 210/670 |
| 4,101,631 | 7/1978 | Ambrosini et al. | 423/210 |
| 4,208,380 | 6/1980 | Hämöläinen et al. | 254/39 X |
| 4,288,422 | 9/1981 | Chianelli et al. | 252/439 X |

FOREIGN PATENT DOCUMENTS

| 2841565 | 4/1980 | Fed. Rep. of Germany | 252/410 |
|---|---|---|---|
| 46-20151 | 5/1971 | Japan | 252/439 |
| 48-66570 | 9/1973 | Japan | 252/439 |
| 49-8460 | 1/1974 | Japan | 252/439 |
| 384206 | 1/1974 | U.S.S.R. | 252/439 |

Primary Examiner—Delbert E. Gantz
Assistant Examiner—William G. Wright
Attorney, Agent, or Firm—Gary L. Wamer

[57] ABSTRACT

Adsorbent compositions and their preparation are disclosed for the adsorption of elemental mercury.

21 Claims, No Drawings

ADSORBENT COMPOSITIONS

FIELD OF THE INVENTION

This invention relates to a new adsorbent for the selective adsorption of elemental mercury, a process for its preparation and to the process for its use.

BACKGROUND

It is a known fact that because of the appreciable volatility and the solubility of mercury in hydrocarbons and water that many naturally occurring gaseous and liquid streams, as well as those derived from various processes, contain elemental mercury. For example, some natural gas streams and artificially produced gas, such as hydrogen produced by the electrolysis of brine, contain varying amounts of mercury. In recent years it has been determined that mercury in both the industrial and consumer environments causes an increased health risk to human and animal elements which are exposed to such mercury or to mercury-containing waste products which may be discharged into local rivers and/or lakes. In addition, mercury is known to cause corrosion problems in industrial equipment. Therefore, mercury which may be present in liquid and vapor streams must generally be removed so as to be at a safe level.

A number of processes are known for the removal of elemental mercury from gaseous streams. For example, U.S. Pat. No. 3,194,629 discloses a process for removing mercury from a gas contaminated with mercury comprising passing the gas over activated carbon impregnated with sulfur. As disclosed in the examples, the patentee prepared the carbon impregnated with sulfur by depositing elemental sulfur on activated carbon with a volatile solvent which was subsequently removed to provide the activated carbon impregnated with sulfur. Although the sulfur impregnated activated carbon did show adsorptive capacity for mercury, the product prepared therein had relatively low adsorption capacity for mercury and had a relatively low rate of adsorption of mercury.

The patentee in U.S. Pat. No. 3,194,629 discloses that the activated carbon appears to have unique intrinsic properties which particularly suit its use as a support for sulfur in the removal of mercury from the gaseous stream as compared against sulfur impregnated silica gel and alumina, which were ". . . much poorer absorbent(s) for mercury vapor than sulfur on activated carbon." Further, the adsorbent would probably exhibit other problems associated with activated carbon adsorbents, such as a high solubility of the impregnated sulfur in hydrocarbons (leaching) and adsorption of a high level of organic compounds.

U.S. Pat. No. 4,101,631 discloses a process for the removal of mercury vapor from gas streams wherein such gas streams contain water vapor and at least 0.02 micrograms of mercury vapor per normal cubic meter. The process comprises passing the gas stream through an adsorption zone containing a crystalline zeolitic molecular seive having a silica to alumina molar ratio of from 2 to 20 and having elemental sulfur loaded thereon in the amount of at least 0.5 weight percent. The process disclosed therein is superior to a process wherein sulfur is loaded on an activated carbon adsorbent. Although this process is substantially better than those theretofore disclosed, such process does not employ the use of a polysulfide-containing adsorbent composition for mercury and the advantages associated therewith. The stability and selectivity of such polysulfide-containing adsorption compositions will be discussed further hereinafter.

U.S. Pat. No. 3,849,537 discloses a method for purifying gases containing elementary mercury by use of a wash solution containing a mercury (II) ion concentration from about 0.02 grams per liter to the saturation point and a corresponding concentration of at least one anion selected from the group consisting of chlorine, bromine, iodine, and sulfate, wherein such anions form insoluble Hg (I) salts in the wash solution. Thus, the process involves the formation of Hg (I) salts by the disproportionation of Hg (II) and elementary mercury. Although such a process should provide for relatively good removal of mercury from such gaseous streams, the inconvenience associated with employing large amounts of wash solution and the necessity of starting with mercury in such wash solutions necessarily makes such a process both inconvenient and hazardous by use of such highly toxic wash solutions.

U.S. Pat. No. 4,094,777 discloses a process for removal of mercury in a gas or liquid wherein the process comprises the use of an adsorption mass consisting essentially of a solid dispersant or support selected from the group consisting of silica, alumina, silicates, aluminates and silico-aluminates which have been impregnated with copper. At least 30% of the copper is present in the sulfide form (CuS) in an amount of 2 to 65% of the weight of the mass. In addition, the adsorption mass contains from 0–5% silver in the sulfide state. Although such a copper sulfide impregnated adsorption mass may have certain desirable properties by virture of the affinity of copper sulfide for mercury, such an adsorption mass would be expected to have limited adsorption capacity owing to the limited amount of sulfur available in copper sulfide since only one half of the sulfur present in copper sulfide is available for reaction with mercury which results in a reduced oxidizing power toward mercury and adsorptive capacity.

The use of aluminosilicates containing transition metals in the ion-exchanged form for mercury adsorption is disclosed in Germany Offen. No. 2,841,565, wherein zeolites, such as Zeolites A, X and Y, are ion-exchanged with transition metals, such as silver, copper, zinc, cadium and nickel, prior to being contacted with a mercury-containing gas. It would appear that the zeolite is functioning primarily as a chemical adsorbent for the elemental mercury by providing for oxidation/reduction reactions involving mercury.

U.S. Pat. No. 3,516,947 discloses a method for preparing a hydrocarbon cracking catalyst for use in hydrocarbon reactions wherein the catalyst is disclosed to be a siliceous crystalline material impregnated with sulfur-containing free radicals. The catalyst is prepared by heating a siliceous crystalline material with sulfur, alkali metal polysulfides, alkaline earth metal polysulfides, a mixture of sulfur and an alkali metal sulfide or a mixture of sulfur and an alkaline earth metal sulfide at a temperature in the range of about 200° C. to about 1200° C. The product as disclosed and claimed by the patentee contains sulfur-containing free radicals trapped within the pores of the siliceous material and does not contain polysulfide compounds.

SUMMARY OF THE INVENTION

This invention relates to "polysulfide-containing" adsorbent compositions, as hereinafter described, for use in the removal of elemental mercury from gaseous and liquid streams. Further, a preferred process for preparing such compositions is disclosed comprising contacting a support material containing a metal cation capable of forming a water insoluble polysulfide (Ksp less than $10^{-9}$) with a sulfide-forming species and with a polysulfide-forming species. Further, a process for the adsorption of mercury from a gaseous or liquid stream is disclosed wherein the compositions of the instant invention are employed.

DETAILED DESCRIPTION

The present invention relates to polysulfide-containing adsorbent compositions, a process for preparing adsorbent compositions and to a process for adsorption of mercury from gaseous or liquid streams by use of such polysulfide-containing adsorbent compositions. The absorbent compositions of this invention comprise a polysulfide, a support material and a metal cation capable of forming an insoluble metal polysulfide.

The term "polysulfide-containing" or "polysulfide" as used herein with reference to the adsorbent compositions of this invention denominate an absorbent composition derived from a "polysulfide-forming species." A "polysulfide-forming species" is any sulfur species which will generate a polysulfide salt with a metal cation so as to form an insoluble metal polysulfide (Ksp less than $10^{-9}$). A "polysulfide salt is a salt" which contains an anion of the formula $S_x^=$ wherein x is greater than 1 and is preferably greater than 1 and less than about 4. Further, the term "polysulfide-containing" or "polysulfide" as used herein is meant to denominate an adsorbent composition containing polysulfide in an amount greater than that amount which may be present in a common sulfide, e.g., CuS, as a result of its formation with only a sulfide-forming species.

It has been discovered that a polysulfide-containing adsorbent composition provides an adsorbent composition having a high adsorptive capacity and selectivity for elemental mercury while being stable, as hereinafter discussed, under the process conditions normally employed for the adsorption of elemental mercury. These adsorbent compositions have been observed to have a unique balance of the adsorptive capacity and rate of adsorption of elemental mercury which being stable at adsorption conditions, as indicated by the low extractability of sulfur from these adsorbent compositions.

The exact nature of the absorbent compositions and the exact form of the sulfur contained therein in association with the support material is not clearly understood at present, although the presence of a sulfur species other than sulfide or elemental sulfur is believed to be responsible for the significantly improved properties of the instant adsorbent compositions, as compared to adsorbent compositions containing sulfur and/or sulfides. It is believed that these unusual adsorption properties of the adsorbent composition of this invention result from the formation of polysulfide compound(s), i.e., "polysolfides". The polysulfide may be associated with the support material in many ways with the objective being to maximize the dispersion of the polysulfide compound to provide the maximum surface area for the polysulfide compound and, it is believed, to provide for the maximum stabilization of the polysulfide compound. Although the exact nature of the polysulfide compound(s) is not clearly understood at present, it is clear that the use of a precursor capable of forming polysulfide, i.e., a "polysulfide-forming species", provides the unique adsorbent compositions of this invention.

The adsorbent compositions of the instant invention may be formed with most any support material so long as the support material may be treated to contain a polysulfide as described herein. Representative of the support materials which may be employed in preparing the adsorbent compositions of this invention are carbons, activated carbons, ion-exchange resins, diatomaceous earths, metal oxides, silicas, aluminas, aluminosilicates and the like. The preferred support materials are support materials having ion-exchange characteristics, i.e., having cations that are at least in part replaceable by another cation. The most preferred support materials are ion-exchange resins and crystalline aluminosilicates. It is believed that the unique adsorptive properties of the instant adsorption compositions are provided by the dispersion of polysulfide on or within the crystalline aluminosilicate by use of the process herein so as to provide for improved dispersion and association of the polysulfide with the aluminosilicate support material. Aluminosilicates believed to be employable herein include: Zeolite A, e.g. U.S. Pat. No. 2,882,243; Zeolite X, e.g. U.S. Pat. No. 2,882,244; Zeolite Y, e.g., U.S. Pat. No. 3,276,789; beta, erionite; mordenite; offentite; chabazite; bentolite; ZSM-type aluminosilicates; and ultrastabiled Y. ZSM-type zeolites are described in various U.S. patents and foreign patents, such as: ZSM-5 (U.S. Pat. No. 3,702,886); ZSM-8 (British Specification No. 1,334,243, published Oct. 17, 1973); ZSM-11 (U.S. Pat. No. 3,709,979); and ZSM-12 (U.S. Pat. No. 3,832,449). Ultrastablized Y is described in "Crystal Structures of Ultrastabile Faujasites", Advances in Chemistry Series, No. 101, American Chemical Society Washington, D.C., pages 266–278 (1971). Representative of ion-exchange resins employable herein are: Amberlites, such as Amberlite 252 and Amberlite I-RC-50 (see: "Amberlite Ion Exchange Resin Laboratory Guide", IE-85-64/77 (9/79) Rohm and Haas, Philadelphia, PA, incorporated herein by reference thereto); and Dowex resins such as Dowex MSC-1 and Dowex HRK-W (see: "Dowex Ion Exchange Resins", Form No. 177-1080-74, Dow Chemical Corporation, Midland, Mich., incorporated herein by reference thereto). "Amberlite" is a trademark of Rohm and Haas and "Dowex" is a trademark of Dow Chemical Corporation.

The ion-exchange resins and the aluminosilicates zeolites which undergo a high level of ion-exchanged are the preferred supports for use herein with zeolites being the preferred supports and with Zeolites X and Y being the most preferred. As above noted, the support material is preferably a zeolite wherein the zeolite has been ion-exchanged or impregnated, preferably ion-exchanged, such that the zeolite contains at least one metal cation capable of forming an insoluble polysulfide, as hereinafter defined. By forming the insoluble polysulfide after the cation, e.g., copper cations, has been provided to the support material it is possible to form adsorbent compositions having higher adsorptive capacities and rates of adsorption, as compared to copper sulfide impregnated compositions having a comparable total sulfur (S) content. The adsorption capacity of the adsorption compositions are may be correlated to the level of dispersion of the polysulfide and it, therefore is preferred to form the adsorbent composition with an ion-exchanged zeolite wherein at least 20 percent of the cation sites have been exchanged with a metal cation which forms an insoluble polysulfide compound, more preferably at least 50 percent and most preferably at least 70 percent.

As noted above, it is believed that the unique ion-exchange characteristics of ion-exchange resins and aluminosilicates are particularly advantageous in providing isolated or highly dispersed cations which are capable of forming the insoluble polysulfide(s) and also provide cation sites which may become associated with the polysulfide(s) and stabilize the polysulfide(s). Whether such association is of a formal bonding type or some other type of association is not presently known and, according the final form of the polysulfide is also not clearly understood. Further, it is believed that the stabilization may result, at least in part, from another ion-exchange process where any cation associated with a polysulfide-forming species exchanges with the cation of the support while the zeolitic cation(s) associates with the polysulfide-forming species to form an insoluble polysulfide, although the exact nature of such association is not presently known. It is believed that the unique ability of ion-exchange resins and aluminosilicates to disperse polysulfide are beneficial properties which are not found in support materials such as carbons, aluminas, silicas and the like. Further, the three dimensional pore structure of many aluminosilicates is believed to be particularly well suited for the stabilization of the polysulfide, such as, $CuS_2$, within the internal pore structure of the aluminosilicate, i.e, within the channels and cages thereof, which polysulfide may otherwise be too unstable to be formed and/or employed under the conditions routinely employed for mercury adsorption.

The adsorbent compositions of this invention comprise a support material containing a cation capable of forming an insoluble polysulfide associated with a polysulfide as obtained from a polysulfide-forming species. The cation used in association with the polysulfide is generally first associated with the support by ion-exchange or impregnation. Since the presence of the polysulfide in the adsorbent composition is related to the overall adsorptive capacity of the adsorbent composition(s) for elemental mercury adsorption, the retention of the polysulfide by the adsorbent composition in the presence of a hydrocarbon and/or water, normal environments for such mercury adsorbents, is important. In general, metal cations which form water insoluble metal polysulfides, i.e., a polysulfide having a Ksp of $10^{-9}$ or less, preferably $10^{-14}$ or less and most preferably $10^{-21}$ or less, may be employed herein. Metal cations believed to be employable in preparing the present adsorbent compositions include metal cations of antimony, arsenic, bismuth, cadmium, cobalt, copper, gold, indium, iron, irridium, lead, manganese, molybdenum, mercury, nickel, platinum, silver, tin, tungsten, titanium, vanadium, zinc, zirconium and mixtures thereof. Particularly preferred are metal cations of copper, cobalt, nickel, manganese and mixtures thereof. Although it is believed that most any salt of the above metals which will provide a metal cation capable of forming an insoluble polysulfide may be employed to provide the requisite metal cation(s) for forming the polysulfide associated with the support material, it has been observed that metal salts which require the use of highly acidic solutions for their dissolution are not preferred when certain crystalline aluminosilicates are employed as the support, since these acidic solutions may damage the crystallinity of certain zeolitic aluminosilicate supports, such as zeolite Y and zeolite X. Salts which are preferred for use in providing a suitable cation to a support material and in particular an aluminosilicate include carboxylic acid salts, nitrates and sulfates.

The amount of the polysulfide in association with the support material is not narrowly critical. The amount of polysulfide present in the adsorbent composition is related, at least in part, to the amount of metal cation present. If the support material is a crystalline aluminosilicate or ion-exchange resin the polysulfide is preferably formed by first providing the metal cation to the support. If the support material cannot be ion-exchanged the support material may be impregnated. When the support material is an ion-exchange resin or is an aluminosilicate, such as the sodium form of Zeolite Y, it is preferred to have at least 20 percent of the cations present therein replaced by at least one metal cation capable of forming an insoluble polysulfide, more preferably at least 50 percent and most preferably at least about 70 percent of the cations of the ion-exchange resin or aluminosilicate will be replaced by such cations, based on the total amount of cation required to occupy the zeolitic or ion-exchange sites. Since the amount of polysulfide present in the adsorbent composition formed with a support is related, at least in part, to the cation concentration and, in turn, the adsorptive capacity of the adsorbent composition is related to the amount of polysulfide present, the adsorption capacity of a given adsorbent composition may be adjusted to provide for varying adsorptive capacities by controlling the amount of metal cation provided, although in most instances an adsorbent composition having the largest adsorptive capacity for mercury will be desired. In terms of the weight of cation and polysulfide, expressed as a weight percent of the total weight of the adsorbent composition, the combined weight of the metal cation and polysulfide will generally be between about 0.05 and about 75 percent by weight of the total weight of the adsorbent composition and is preferably between about 1 and about 40 percent by weight of the total weight of the adsorbent composition.

The polysulfide is generally provided to the support material after the requisite metal cation(s) has been provided to the support material, although such may be provided concurrently. A polysulfide-forming species may be provided to the support material in a number of ways. One means of providing a polysulfide-forming specie(s) comprises the use of a sulfane in the vapor state at temperatures between about 70° C. and about 300° C. or the use of sulfanes in an organic solvent, i.e., the use of an organic liquid phase containing a sulfane(s). The polysulfide-forming species in either the vapor or liquid state is associated with the metal cation containing support material to form the polysulfide-containing adsorbent compositions of this invention. Another means of forming the polysulfide(s) would be to heat sulfur and a sulfide containing support material(s). Although the above methods are all believed to provide polysulfide-forming species, it is believed that these processes will not be as convenient or advantageous as providing polysulfide anions in solution to the metal cation-support material.

A high level of retention of the sulfur (S) content of the adsorbent composition in a hydrocarbon environment, i.e., stability, has not to date been observed in adsorbent compositions prepared with a zeolitic aluminosilicates in the sodium form of when the adsorbent composition is formed by use of solutions of only a polysulfide salt, e.g., an alkali metal tetrasulfide salt, although the adsorption capacity of such adsorbent compositions has been observed to be much greater than that observed for sulfur or sulfide containing adsorbent compositions. It has been observed that a synergism arises and a resulting stabilization observed in the adsorbent compositions of this invention when mixtures of sulfide-forming ($S^{2-}$) and polysulfide-forming species ($S_x^{2-}$), preferably an alkali metal tetrasulfide, are used in the preparation of the polysulfide-containing adsorbent compositions, wherein x is between 2 and about 8 and preferably between about 3 and about 8. Accordingly, this is the preferred preparative method of the instant invention and is particularly advantageous in that adsorbent compositions are formed which have improved stability under the conditions commonly encountered in mercury adsorption. This stability has been demonstrated by a low toluene Soxhlet extraction wherein less than about 5.0 weight percent sulfur, based on the total sulfur present on the adsorbent composition, regardless of its form, is extracted by means of a toluene extraction with the toluene Soxhlet extraction being carried out as hereinafter set forth.

The exact nature of the observed synergism that occurs when a mixture of a sulfide-forming specie(s) and a polysulfide-forming specie(s) (a synergistic mixture) is employed is not clearly understood, although the improved nature of the adsorbent compositions derived therefrom is readily apparent. Accordingly, the adsorbent compositions of this invention are preferably derived from a sulfide-forming species and a polysulfide-forming species with the preferred process for the preparation of the adsorbent compositions of this invention comprising:

(a) contacting a support material, preferably a crystalline aluminosilicate zeolite, with a solution containing at least one cation capable of forming an insoluble polysulfide; and (b) contacting the cation containing support of step (a) with a sulfide-forming species and a polysulfide-forming species.

The adsorbent composition formed from the combination of an aluminosilicate, particularly Zeolite X and Y, exchanged with $Cu^{+2}$, $Co^{2+}$, $Ni^{2+}$, $Mn^{2+}$ and mixtures thereof and sulfide-forming and polysulfide-forming species are the preferred synergistic combinations owing to the unique observed correlation of the stability, adsorptive capacity and selectively for elemental mercury.

Although the exact nature of the final adsorbent composition derived from the above-described preferred preparative method is not completely understood, it is clear that the adsorbent compositions derived therefrom are superior for use as a mercury adsorbent as compared to adsorbent compositions derived by use of only a sulfide salt or by the use of only a polysulfide salt.

The adsorbent compositions of this invention prepared by use of a polysulfide-forming species, and preferably such in admixture with a sulfide-forming species which, are preferably provided in admixture in a solvent in which such is at least partially soluble. Alternatively, polysulfide-forming species and, when employed, the sulfide-forming species may be individually or concurrently contacted with the support material in the liquid or vapor phase, although concurrent treatment is believed to be preferred. Typically, the solvent will be a solvent with a dielectric constant above about 10° at 25° C. or its melting point, whichever is higher. Representative solvents are water, carbon disulfide, acetone and organic solvents such as ethanol, benzene and the like. When the sulfide-forming species is a sulfide anion, the anion in solution may be formed from most any sulfide salt including the alkali metal sulfides, e.g., sodium sulfide and potassium sulfide, hydrogen sulfide, ammonium sulfide and the like. Similarly, the polysulfide-forming species may be polysulfide anion in solution where polysulfide anion may be provided by a polysulfide salt including alkali metal polysulfides, such as sodium tetrasulfide or potassium tetrasulfide or by a sulfanes such as $H_2S_2$, $H_2S_3$, $H_2S_4$, $H_2S_5$ and $H_2S_6$ and the mixtures of higher sulfanes (sulfanes of the formula $H_2S_n$ where n is greater than 6). Any method which provides the polysulfide anion in solution may be employed herein including the reaction sulfide salt ($S^=$) and sulfur to generate polysulfide anions in situ. The preferred polysulfides are the tetrasulfide salts of the alkali metals.

When the adsorbent compositions of this invention are prepared with a mixture of a sulfide salt, e.g. an alkali metal sulfide, and a polysulfide salt, e.g. an alkali metal polysulfide, the mole ratio of the sulfide to polysulfide is generally between about 50 to 1 and about 1 to 50, preferably between about 1 to 20 and about 20 to 1, and is most preferably is between about 1 to 5 and 5 to 1. Typically, the mole concentration of the sulfide and polysulfide anions in the mixture are between about 0.5 and 2 molal with the mole ratio of sulfide to polysulfide preferably being about 1 to 5 and 5 to 1. The bulk concentration in the sulfide/polysulfide mixture, i.e., mixture of sulfide-forming species and polysulfide-forming species, preferably is characterized as having an average formula for the total sulfur present in the mixture of $M_yS_x$ where M is a metal cation (charge has been omitted) and x/y is a value between about 0.51 and about 4 and preferably is between about 0.51 and about 3.

It has been observed that sulfide/polysulfide mixtures tend to be highly basic mixtures when the sulfide/polysulfide mixture is derived from sulfide and polysulfide salts. Some support materials such as zolites and/or zeolite aggregates, may be damaged by such basic mixtures when contacted therewith. As a result, it is preferred to employ such a basic mixture of sulfide/polysulfide as a concentrated solution (e.g., 1 molal in sulfide and 0.5 molal in tetrasulfide) so that the mixture may be contacted with the metal cation-support material for a minimal period of time to provide polysulfide to the metal-containing support materal while the integrity of the support material is not unduly damaged by the highly basic nature of the sulfide/polysulfide mixture. It has been observed that contact times of a few minutes provide suitable adsorbent compositions, although contact times up to several hours or more may be employed, although long contact times may cause a loss in the final weight of the adsorption composition owing to the affect that highly caustic solutions have on certain support materials, e.g. aluminosilicates, and/or the binders employed in their manufacture. Further, since such sulfide/polysulfide mixtures are highly basic the final adsorbent composition should be thoroughly washed with a solvent, e.g., the polar solvent used in the preparation of the sulfide/polysulfide mixture, so as to remove residual solution.

The sulfide/polysulfide mixture may be generally contacted with the metal-containing support material at a temperature between about 0° C. to about 200° C. and higher. When the support material is an aluminosilicate, such as Zeolites X and Y, it has been found that at ambient temperatures (about 18° C. to 22° C.) that stable adsorbent compositions are prepared.

The polysulfide-containing compositions of this invention may be used to remove elemental mercury from a wide range of liquid and/or vaporous streams (both hydrocarbon and water-containing) containing a wide range of concentrations of mercury. In most cases the stream will contain between about 0.005 and about 200 micrograms of mercury per normal cubic meter of gas ($10^{-6}$ g/m$^3$). In terms of the concentration on a volume basis, this is in the range betwen about $5.5 \times 10^{-6}$ to 22 parts per billion. The stream being treated may have higher concentrations of mercury and in such case the adsorbent composition would necessarily become saturated with mercury more quickly. The removal of mercury is carried out in general by passing the gas or liquid stream in contact with a sorption zone containing the polysulfide-containing adsorbent composition, as hereinbefore described, whereby mercury is sorbed from the stream. The effluent is a mercury-depleted stream which is recovered from the sorption zone.

The following examples are provided to further illustrate the instant and are not intended to be limiting thereof:

EXAMPLES 1-24

Adsorbent Preparation

Examples 1-24 are preparative examples detailing the preparation of adsorbents compositions for use for comparative purposes and prepared in accordance with the instant invention. The adsorbent materials were prepared by first exchanging a support material with a selected metal cation by contacting the support material with salt solutions (aqueous) of copper acetate, copper sulfate, nickel acetate, iron (II) acetate, manganese (II) acetate, and the like as identified in the following examples.

The adsorbents compositions prepared in the following examples were prepared using the parameters set forth in Table I. The support material was selected as Zeolite X, Zeolite Y or an alumina cement which are designated X, Y and AC, respectively. The support material was treated with a metal salt and the molal concentration of the metal salt is indicated by the value in parentheses following the designation of the metal salt. The treatment with the metal salt was carried out under standard column ion exchange conditions at ambient temperature or higher with a 3 to 10 fold excess (based on equivalents required) of the metal salt solution, except where noted. The abbreviation "ac" denotes that a salt is a metal acetate. The metal salt treated support material was then treated with a sulfur compound by contacting the support material and an aqueous solution of the sulfur compound or elemental sulfur. The molal concentration of the sulfur compound or weight of sulfur (based on the total weight of the adsorbent composition) is indicated by the numerical value in parentheses. The alumina cement was obtained from Lone Star Cement Company and is identified as SECAR 71 (Trademark of Lone Star Cement Company). The properties of SECAR 71 are disclosed in Technical Bulletin R-200 published in January 1982, such being incorporated herein by reference thereto.

TABLE I

| Example | Adsorbent Support | | Sulfur Treatment | | |
|---|---|---|---|---|---|
| | Support | Metal Salt | Sulfur Reagent | Time (hs) | Temp (°C.) |
| 1 | X | CaCl$_2$(1.3) | Sulfur(3) | 7 | 170 |
| 2 | Y | FeSO$_4$(0.5) | Na$_2$S$_4$(2.5) | 1.5 | 25 |
| 3 | Y | FeSO$_4$(0.5) | Na$_2$S(0.16) | 10.0 | 25 |
| 4 | Y | Co(ac)$_2$(0.5) | Na$_2$S$_4$(2.5) | 1.5 | 25 |
| 5 | Y | Co(ac)$_2$(0.5) | Na$_2$S$_4$(0.5) | .08 | 100 |
| | | | Na$_2$S(1.0) | — | — |
| 6 | Y | Co(ac)$_2$(0.5) | Na$_2$S(0.4) | 4.0 | 25 |
| 7 | Y | Ni(NO$_3$)$_2$(0.5) | (NH$_4$)$_2$S$_2$(2.4)* | 0.17 | 70 |
| 8 | Y | Ni(NO$_3$)$_2$(0.5) | Na$_2$S(1.0) | 0.10 | 100 |
| | | | Na$_2$S$_4$(0.5) | — | — |
| 9 | Y | Ni(NO$_3$)$_2$(0.5) | Na$_2$S(2.0) | 0.1 | 25 |
| 10 | X | Cu(ac)$_2$(0.3) | Na$_2$S(1.3) | 20 | 325 |
| | | | Sulfur(3) | | |
| 11 | Y | Cu(SO$_4$)(0.6) | Na$_2$S(1.0) | 0.08 | 100 |
| | | | Na$_2$S$_4$(0.5) | — | — |
| 12 | Y | Cu(ac)$_2$(0.3) | Na$_2$S(0.16) | 17 | 25 |
| 13 | AC | CuCO$_3$ | H$_2$S | —** | 25 |
| 14 | AC | CuCO$_3$ | H$_2$S | 25 | 25 |
| 15 | Y | ZnCl$_2$(0.5) | Na$_2$S$_4$(2.5) | 17 | 25 |
| 16 | Y | ZnCl$_2$(0.5) | Na$_2$S(1.0) | 0.1 | 100 |
| | | | Na$_2$S$_4$(0.5) | — | — |
| 17 | Y | ZnCl$_2$(0.5) | Na$_2$S(2.0) | 0.1 | 25 |
| 18 | Y | MnSO$_4$(0.5) | Na$_2$S$_4$(2.5) | 1.5 | 25 |
| 19 | Y | MnSO$_4$(0.5) | Na$_2$S(1.0) | 0.08 | 100 |
| | | | Na$_2$S$_4$(0.5) | — | — |
| 20 | Y | MnSO$_4$(0.5) | Na$_2$S(2) | 0.1 | 25 |
| 21 | X | CaCl$_2$(1.3) | Sulfur(10) | 17 | 175 |
| 22 | Y | CuSO$_4$(0.5) | Na$_2$S$_4$(2.5) | 1.5 | 25 |
| 23 | Y | CuSO$_4$(0.6) | Na$_2$S(1.0) | 0.1 | 25 |
| | | | Na$_2$S$_4$(1.0) | — | — |
| 24 | Y | Ni(NO$_3$)(0.50) | Na$_2$S$_4$(2.5) | 0.1 | 25 |

*Empirical formula based on reaction mixture of (NH$_4$)$_2$S and S.
**Until equilibrium was reached.

EXAMPLES 25 TO 44

(a) In order to compare the effectiveness of the polysulfide-containing adsorbent compositions of this invention with sulfur containing and copper sulfide containing compositions, the adsorbent composition prepared above were tested as set forth hereinafter.

The following three procedures were employed to characterize the adsorbents and to demonstrate the advantages derived from the polysulfide-containing adsorbent compositions of this invention when employed for the adsorption of elemental mercury.

I. McBAIN ADSORPTION

The adsorption capacity of an adsorbent was determined by use of a modified McBain adsorption balance. After activation of an adsorbent (heated in vacuo at 150° F.), mercury was introduced to the McBain tube through a side arm equipped with a Teflon (Trademark of E. I. de Nemours Dupont) stopcock such that a mercury pool (about 10-15 grams) was present. The mercury in the McBain balance was cooled with stirring (magnetic) with a circulating water bath and maintained at about 60° F. Each adsorbent (about 1.5 grams) was tested in a McBain balance heated in vacuo at 150° F. and exposed to mercury vapor by maintaining the P/P$_o$ for mercury at less than 0.1. The adsorption capacity was determined by monitoring the increase in the weight of the adsorbent due to adsorption of mercury as a function of time with determination of the adsorption capacity being made when the rate of adsorption was less than five (5) percent of the rate observed during the first day of the McBain adsorption experiment.

II. DYNAMIC MERCURY REMOVAL

The Dynamic Mercury Removal (which is a measure of the Percent (%) Unadsorbed Hg), i.e., the efficiency of the adsorbent for mercury removal, provides a measure of the rate of adsorption of the adsorbent for mercury. To measure the Dynamic Mercury Removal a 50 gram sample (1/16 inch pellets) was placed in a 1.28"×4.8" column. The adsorbent column was then contacted with a nitrogen stream (70° F.), dry or saturated with water and containing 120 micrograms of mercury per normal cubic meter of the feed. The flow rate of the stream was varied, as set forth in the following examples and the mercury content of the effluent stream (stream leaving the adsorbent column) was continuously analyzed with a Dupont photometric analyzer. An adsorbent having a lower numerical value for the "% Unadsorbed Hg" is characterized as having a rate of adsorption greater than an adsorbent with a higher numerical value for the "% Unadsorbed Hg".

III. SOHXLET EXTRACTION

The relative stability of an adsorbent was evaluated by use of a Sohxlet extractor (Model No. 24005 (Kimble)) as described at page 509 of the 1982/83 Catalog of VWR Scientific, with toluene as the solvent. Since retention of the sulfur by an adsorbent is related to the utility of the adsorbent for mercury adsorption, an adsorbent characterized by a lower sulfur extraction is preferred. The toluene Sohxlet extraction was carried out using about ten (10) grams of an adsorbent and about 150 milliliters of toluene was employed as the solvent. The Sohxlet extraction was carried out for about three (3) hours with a given adsorbent with the extraction being carried out with toluene at a temperature of about 110° C.

(b) The adsorption capacity of several adsorbent compositions were tested using the above-described McBain adsorption procedure. The results for examples 1 to 20 are set forth in Table II hereinafter. For convenient reference the form of the sulfur treatment has been included. The results show that the use of a polysulfide or a mixture of sulfide and polysulfide as the treating solution resulted in a higher adsorption capacity for elemental mercury than did treatment with a sulfide treating solution or with sulfur.

TABLE II

| Example[1] | Sample | Adsorbent Support[3] | Sulfur Reagent | Capacity |
|---|---|---|---|---|
| 25* | 1 | CaX | Sulfur(3) | 14.9 |
| 26 | 2 | FeY | $Na_2S_4$(2.5) | 26.3 |
| 27* | 3 | FeY | $Na_2S$(0.16) | 0.65 |
| 28 | 4 | CoY | $Na_2S_4$(2.5) | 7.6 |
| 29 | 5 | CoY | $Na_2S_4$(0.5) $Na_2S$(1.0) | 4.6 |
| 20* | 6 | CoY | $Na_2S$(0.4) | 0 |
| 31 | 7 | NiY | $(NH_4)_2S_2$(2.4) | 18.8 |
| 32 | 8 | NiY | $Na_2S$(1.0) $Na_2S_4$(0.5) | 7.1 |
| 33* | 9 | NiY | $Na_2S$(2.0) | 0.88 |
| 34* | 10 | CuX | $Na_2S$(1.3) Sulfur(3) | 6.8 |
| 35* | 11 | CuY | $Na_2S$(1.0) $Na_2S_4$(0.5) | 6.4 |
| 36* | 12 | CuY | $Na_2S$(0.16) | 4.0 |
| 37* | 13 | CuAC | $H_2S$ | 2.6 |
| 38* | 14 | CuAC | $H_2S$ | 5.9 |
| 39 | 15 | ZnX | $Na_2S_4$(2.5) | 6.0 |
| 40 | 16 | ZnY | $Na_2S$(1.0) $Na_2S_4$(0.5) | 2.8 |

TABLE II-continued

| Example[1] | Sample | Adsorbent Support[3] | Sulfur Reagent | Capacity |
|---|---|---|---|---|
| 41* | 17 | ZnY | $Na_2S$(2.0) | 0.2 |
| 42 | 18 | MnY | $Na_2S_4$(2.5) | 18.9 |
| 43 | 19 | MnY | $Na_2S$(1.0) $Na_2S_4$(0.5) | 4.0 |
| 44* | 20 | MnY | $Na_2S$(2) | 0.3 |

[1]An asterisk designates an examples as a comparative example.
[2]The Hg capacity is given as the weight percent gain of the adsorbent based on the initial weight of the adsorbent:

$$Hg\ Capacity = \frac{wt.\ increase}{initial\ wt.} \times 100$$

[3]Cations associated with a zeolite or alumina cement are designated in the form MX, MY or MAC where M represents the cation associated with Zeolite X or Y or with alumina cement (AC).

EXAMPLES 45–57

The stability of several adsorbent compositions were tested by carrying out the toluene Sohxlet extraction as hereinbefore described. Since the adsorption capacity of an adsorbent may be related to the stability of the sulfur or sulfur compound present in the adsorbent, the lower the amount of extractable sulfur the more preferred will be the adsorbent composition. The amount of sulfur extracted by Sohxlet extraction of the adsorbent, regardless of form, for the adsorbent composition of examples 44 to 56 are set forth in Table III. The low extractability of sulfur from adsorbent compositions formed with mixtures of sulfide, and tetrasulfide demonstrates the improved stability that the adsorbent compositions of the instant invention exhibit in the presence of organic compounds.

TABLE III

| Example[1] | Sample[2] | Adsorbent[4] Support | Sulfur Reagent | % Sulfur[3] Extracted |
|---|---|---|---|---|
| 45* | Ex. 21 | CaX | Sulfur(10) | 44 |
| 46 | Ex. 18 | MnY | $Na_2S_4$(2.5) | 55 |
| 47 | Ex. 19 | MnY | $Na_2S$(1.0) $Na_2S_4$(0.5) | 34 |
| 48 | Ex. 4 | CoY | $Na_2S_4$(2.5) | 21.8 |
| 49 | Ex. 5 | CoY | $Na_2S_4$(0.5) $Na_2S$(1.0) | 2.6 |
| 50* | Ex. 3 | FeY | $Na_2S$(0.16) | 1.5 |
| 51 | Ex. 22 | CuY | $Na_2S_4$(2.5) | 57 |
| 52 | Ex. 11 | CuY | $Na_2S$(1.0) $Na_2S_4$(0.5) | 0 |
| 53 | Ex. 23 | CuY | $Na_2S$(1.0) $Na_2S_4$(1.0) | 0 |
| 54 | Ex. 12 | CuY | $Na_2S$(0.16) | 0 |
| 55 | Ex. 24 | NiY | $Na_2S_4$(2.5) | 39.0 |
| 56 | Ex. 8 | NiY | $Na_2S$(1.0) $Na_2S_4$(0.5) | 0 |
| 57* | Ex. 9 | NiY | $Na_2S$(2.0) | 0 |

[1]An asterisk (*) designated the example as a comparative example.
[2]Adsorbent composition prepared in the indicated example.
[3]% Sulfur Extracted = $\frac{wt.\ of\ Sulfur\ in\ toluene\ extract \times 100}{total\ wt.\ of\ Sulfur\ on\ support\ prior\ to\ extraction}$
[4]Cations associated with a zeolite or alumina cement are designated in the form MX, MY or MAC where M represents the cation associated with Zeolite X or Y or with alumina cement (AC).

EXAMPLES 58 TO 62

The rate of adsorption of mercury by an adsorbent was determined by carrying out the Dynamic Mercury Removal procedure, as hereinbefore described. An adsorbent composition having a low percent (%) Unabsorbed mercury (Hg), i.e., mercury in the effluent, provides a better adsorbent composition since a greater percentage of the mercury contained in the stream is retained by the adsorbent. The results of examples 57 to 62 are set forth in Table IV.

TABLE IV

| Example[1] | Sample[2] | Adsorbent[6] Support | Sulfur Reagent | Flow Rate[3,4] | | % Unadsorbed[5] Hg |
|---|---|---|---|---|---|---|
| 58* | Ex 1 | CaX | Sulfur(3) | Case A | 23.5 | 1.2 |
|  |  |  |  |  | 54.9 | 17.5 |
|  |  |  |  |  | 86.3 | 29.2 |
|  |  |  |  | Case B | 5.6 | 49.1 |
|  |  |  |  |  | 24.7 | 82.2 |
| 59* | Ex 3 | FeY | Na$_2$S(0.16) | Case B | 23.8 | <1 |
|  |  |  |  |  | 81.8 | 22.6 |
| 60* | Ex 14 | CuAC | H$_2$S | Case A | 25.6 | <3.6 |
|  |  |  |  |  | 57.7 | 13.0 |
| 61 | Ex 4 | CoY | Na$_2$S$_4$(2.5) | Case B | 25.9 | <1 |
|  |  |  |  |  | 65.2 | 13.2 |
| 62 | Ex 11 | CuY | Na$_2$S(1.0) | Case B | 26.5 | <1 |
|  |  |  | Na$_2$S$_4$(0.5) |  | 64.1 | <1 |
|  |  |  |  |  | 83.5 | 2.4 |

[1] An asterisk (*) designates the example as a comparative example.
[2] Adsorbent composition prepared in the indicated example.
[3] Flow rate of stream containing about 120 micrograms of elemental mercury per cubic meter given in cubic feet per min (ft$^3$/min) at about 70° F. using about 50 grams of each adsorbent.
[4] Case A denotes a dry stream; and Case B denotes a stream saturated with water at 70° F.
[5] % Unadsorbed Hg = $\frac{\text{weight in effluent}}{\text{weight in stream}} \times 100$
[6] Cations associated with a zeolite or alumina cement are designated in the form MX, MY or MAC where M represents the cation associated with Zeolite X or Y or with alumina cement (AC).

What is claimed is:

1. Adsorbent compositions for use in the adsorption of elemental mercury consisting essentially of a support material selected from the class consisting of aluminosilicates, ion-exchange resins, alumina, silica and carbon; a cation selected from the group consisting of antimony, arsenic, bismuth, cadmium, cobalt, copper, gold, indium, iron, lead, manganese, molybdenum, mercury, nickel, platinum, silver, tin, tungsten, titanium, vanadium, zinc, zirconium and mixtures thereof wherein the cation is present in an amount which is at least 20 percent of the total of the amount required to occupy the cation sites; and a polysulfide.

2. The adsorbent composition of claim 1 for use in the adsorption of elemental mercury from a gas or liquid stream comprising a crystalline aluminosilicate selected from the class consisting of Zeolite X and Zeolite Y, at least one cation selected from the group consisting of copper, cobalt, manganese, nickel and mixtures thereof and a polysulfide.

3. The process for the preparation of adsorbent compositions for elemental mercury comprising:
   (a) providing a support material selected from the class consisting of aluminosilicates, alumina, ion-exchange resins, carbons and silicas with at least one cation capable of forming an insoluble polysulfide and selected from the group consisting of antimony arsenic, bismuth, cadmium, cobalt, copper, gold, indium, iron, lead, manganese, molybdenum, mercury, nickel, platinum, silver, tin, tungsten, titanium, vanadium, zinc, zirconium and mixtures thereof; and
   (b) contacting the cation-containing support material of step (a) with a sulfide-forming species and a polysulfide-forming species.

4. The process of claim 3 wherein the sulfide-forming species and polysulfide-forming species are selected from the class of sulfides and polysulfides, respectively, consisting of alkali metals, alkaline earth metals, ammonium, quaternary ammonium cations and mixtures thereof.

5. The process of claim 3 wherein the mole ratio of sulfide to polysulfide is between about 50 to 1 and about 1 to 50.

6. The process of claim 3 wherein the mole ratio of sulfide to polysulfide is between 10 to 1 and about 1 to 10.

7. The process of claim 3 wherein the process is carried out in the vapor state.

8. The process of claim 3 wherein the process is carried out in the liquid state.

9. The process of claim 3 wherein the polysulfide-forming species is a sulfane.

10. The process of claim 3 wherein the polysulfide-forming species is a tetrasulfide of ammonium or an alkali metal.

11. The process of claim 10 wherein the sulfide-forming species is a sulfide of an alkali metal.

12. The process of claim 3 wherein the support material is a crystalline aluminosilicate.

13. The process of claim 3 wherein the support material is an ion-exchange resin.

14. The process of claim 3 for the preparation adsorbent compositions comprising contacting a zeolite selected from the class consisting of zeolites X and Y wherein such zeolite cotains a cation selected from the class consisting of copper, cobalt, manganese, nickel and mixtures thereof with a mixture of a sulfide and a polysulfide wherein the mole ratio of sulfide to polysulfide is betwen about 5 to 1 and about 1 to 5.

15. The process of claim 14 wherein the polysulfide is an alkali metal tetrasulfide.

16. The process of claim 14 wherein at least 20 percent of the cations of zeolite Y and/or zeolite X are selected from the class consisting of copper, nickel, cobalt, manganese and mixtures thereof.

17. The process of claim 12 wherein the aluminosilicate is selected from the class consisting of Zeolite X, Zeolite Y, Zeolite A and ZSM-type zeolites.

18. The process of claim 17 wherein the aluminosilicate is Zeolite X.

19. The process of claim 17 wherein the aluminosilicate is Zeolite Y.

20. The composition prepared by the process of claim 14.

21. The adsorbent composition prepared by the process of claim 12.

* * * * *